Patented Dec. 19, 1933

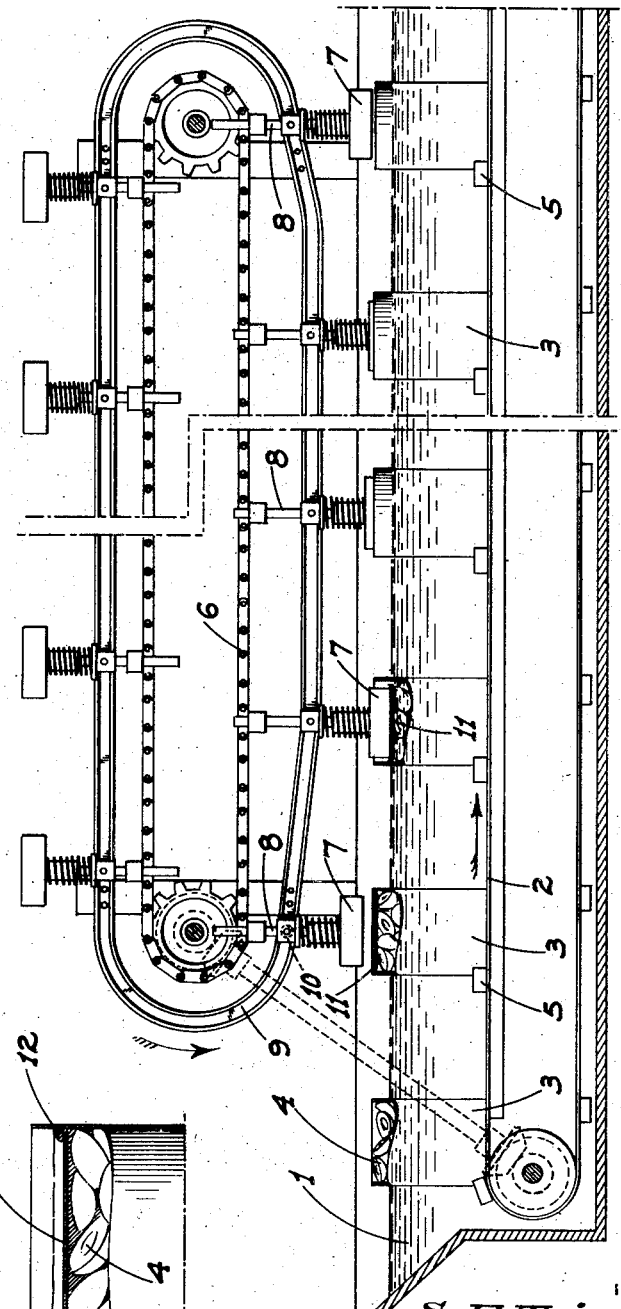

1,940,337

UNITED STATES PATENT OFFICE 1,940,337

METHOD OF PRESERVING PERISHABLE FOOD PRODUCTS

Stanley F. Triplett and John B. Beard, Modesto, Calif.

Application September 25, 1931
Serial No. 565,082

7 Claims. (Cl. 62—170)

This invention relates to the preservation of perishable food products such as fruits and vegetables of certain kinds, after they have been initially prepared and placed in cans.

The principal object of our invention is to provide a method for preserving such products with the aid of a freezing medium, in such a manner that the natural juices of the products are caused to be exuded from and to completely surround and cover the products in the cans, without any precooking of the same being necessary and prior to the action of the freezing medium. When the method or process is completed therefore the products are sealed within their frozen juices and will keep indefinitely as long as the juices are kept below the freezing point. Also the individual products while retained in a frozen condition do not shrivel excessively as is the case when they are kept frozen in an unconfined condition and which tends to break down their fibres and spoil their firmness when thawed out.

Essentially the method consists in placing the fruit etc. in open topped cans, with or without a certain amount of sugar as conditions may warrant; temporarily subjecting the fruits in the can to a pressure to cause the juices to be exuded to an amount sufficient to cover the fruits, and freezing the juices while they thus cover the fruits. In the case of apricots this pressure can be applied either before the freezing of the juices, and then released; or during such freezing since this fruit does not tend to again expand when once compressed. With peaches however the pressure must be maintained during freezing of the fruit on account of the tendency of this particular fruit to again expand after the pressure is released before the fruit is frozen. In either case the fruit after being compressed freezes before the juices on account of the relatively low sugar content, and this freezing holds the fruit compressed against again expanding. The compressing element may then be removed from the can and the juices when they freeze will of course expand somewhat and will fill the spaces between individual fruits and will rise about and over the top layer of fruit in the can to form an air tight seal.

The purpose of the pressure is threefold:

To enable more fruit to be placed in the can than would otherwise be possible; to eliminate air pockets, as much as possible; and to expel the juices from the fruit to fill any remaining air spaces and also if possible to cover the top layer of fruit.

The accompanying drawing illustrates one manner in which the method may be carried out; Fig. 1 showing a longitudinal view of an apparatus for pressing the fruit and simultaneously freezing the contents thereof; while Fig. 2 is a fragmentary section of a can the contents of which have been subjected to our preserving method.

In the drawing 1 denotes a freezing bath of brine or the like in which is mounted a horizontal conveyor 2 for the cans 3 of the products 4 to be preserved; which cans are located in definitely spaced relation along the conveyor by suitable cleats 5 or the like. The cans are open on top and of course project above the bath. Arranged above the bath and parallel to the conveyor is an endless chain 6 or similar member which is driven at the same speed as the conveyor and so that their adjacent runs both move in the same direction.

Mounted in connection with and projecting from the chain are plungers 7 of a size to fit loosely in the cans and spaced apart the same as the spacing of the cans on the conveyor, so that they may aline therewith. The stems 8 of the plungers are mounted in connection with the chains for sliding movement at right angles thereto; such movement being controlled by a fixed cam track 9 engaging rollers 10 fixed with and to one side of the stems. This cam track is arranged so that as the cans advance the plungers will be depressed into the same a certain distance and will be retained therein during a predetermined travel of the cans, and will then be automatically withdrawn. The timing of the speed of the conveyor and duration of the engagement of the plungers with the fruit is of course governed by the temperature of the freezing medium and the nature of the product being treated so that by the time the plungers are withdrawn from the cans the fruit itself is frozen.

This particular apparatus is claimed in our co-pending application on the same, Serial No. 565,083, filed September 25, 1931.

In connection with the cans we preferably provide discs 11 of water-proof paper, tin or other non-porous material which are placed in the different cans on top of the same before the plungers descend. The discs do not have a tight fit in the cans so that the juices as they rise ooze through the space between the edges of the discs and cans and when frozen form air tight seals between the discs and cans as indicated at 12 in Fig. 2.

Another method of carrying out the process consists in placing the fruit in the cans in layers, and applying pressure to the different layers in successive order as they are placed in the can, until the can is properly filled.

With either method sugar, glucose or other material may if necessary be added in predetermined proportions while the container is being filled, so as to combine with the juices and act as a preservative.

We have found that in certain instances insufficient juice is exuded to cover the top layer of fruit. In such cases, we pour a top layer of some material such as a sugar, glucose, starch or flour mixture in the can after the pressure is released to prevent the air from coming in contact with the fruit and acting as a protection against oxidizing or darkening of the fruit.

As a result of the use of this method in preserving fruit or similar produce for transportation or storage, only the valuable or useful elements are handled, and hence there is no waste weight to be carried or paid for in freight or other charges as is the case when the fruits are merely depressed in a surrounding body of water and then frozen, as has been previously done. By compressing the fruit, not only will the juices squeeze out so as to form the desired surrounding liquid for the fruit, but when the contents of the can thaw, the can will still be in a substantially full condition, since a certain amount of the juices will be reabsorbed into the fruit and the actual shrivel of the same will be very small.

Having thus described our invention what we claim as new and useful and desire to secure by Letters Patent is:

1. The method of preserving fruits and like perishable food products consisting in treating such products to cause the juice thereof to be exuded therefrom, retaining such juices in surrounding and covering relation to the products and then freezing the juices.

2. The method of preserving fruits and like sugar containing perishable food products consisting in compressing the products in a container to exude the juices from the products into the container and about the products and so that the sugar content of the products is reduced, and while said products are initially held compressed, subjecting the containers to a freezing action so that the products and their juices are successively frozen.

3. The method of preserving fruits and like perishable food products consisting in compressing the products in a container to exude the juices from the products into the container and about the products and subjecting the container and the contents thereof to the action of a freezing agent.

4. The method of preserving fruits and like perishable food products consisting in compressing the products in a container to exude the juices from the products into the container and about the products and subjecting the container and the contents thereof to the action of a freezing agent sufficient to freeze said products before releasing them from the compressing action.

5. The method of preserving fruits and like perishable sugar containing food products consisting in compressing the products in a container to exude the juices from the products into the container and about the products so that their sugar content is reduced, subjecting the containers to the action of a freezing agent so that the products and juices are successively frozen, and releasing the products from the compressive action between the freezing of the products and their juices.

6. The method of preserving fruits and like perishable food products consisting in placing the products in an open-topped container, placing a non-porous loose fitting element in the container on top of the products, depressing said element to compress the products and cause the juices to be exuded therefrom to an amount sufficient to cause them to rise and pass between the element and side walls of the container, and then freezing the contents of the container while the juices are thus exuded.

7. The method of preserving fruits and like perishable food products consisting in compressing the products in a container to exude the juices from the products into the container and about the products, placing an air sealing material in the container to an amount sufficient to cover the top layer of compressed products, and then subjecting the container to a freezing action while said products are held compressed.

STANLEY F. TRIPLETT.
JOHN B. BEARD.